(12) United States Patent
Maebe (10) Patent No.: US 10,357,111 B2
(45) Date of Patent: Jul. 23, 2019

(54) RELEASEABLY ENGAGED ARMCHAIR CUSHION

(71) Applicant: Richard Maebe, Oceanside, CA (US)

(72) Inventor: Richard Maebe, Oceanside, CA (US)

( * ) Notice: Subject to any disclaimer, the term of this patent is extended or adjusted under 35 U.S.C. 154(b) by 0 days.

(21) Appl. No.: 15/727,495

(22) Filed: Oct. 6, 2017

(65) Prior Publication Data

US 2019/0104854 A1 Apr. 11, 2019

(51) Int. Cl.
*A47C 7/54* (2006.01)
*B60N 2/75* (2018.01)
*A47C 7/62* (2006.01)

(52) U.S. Cl.
CPC .............. *A47C 7/546* (2013.01); *A47C 7/54* (2013.01); *A47C 7/62* (2013.01); *B60N 2/787* (2018.02)

(58) Field of Classification Search
CPC .. A47C 7/546; A47C 7/54; A47C 7/62; B60N 2/787
USPC ........................................................ 297/227
See application file for complete search history.

(56) References Cited

U.S. PATENT DOCUMENTS

| | | | | |
|---|---|---|---|---|
| 3,311,408 A * | 3/1967 | Sarvas | .................... | A47C 31/11 297/218.3 |
| 5,332,288 A * | 7/1994 | Coates | .................... | B60N 2/787 297/411.21 |
| 5,809,595 A * | 9/1998 | Stevens | ................. | B60N 2/6036 297/219.1 |
| 5,975,390 A * | 11/1999 | Saroli | ..................... | A63B 57/00 224/274 |
| 6,827,405 B1 * | 12/2004 | Roberts | ................... | A47C 7/546 297/188.18 |
| 6,918,148 B2 * | 7/2005 | Auxila | .................. | A47D 13/083 2/16 |
| 7,431,396 B1 * | 10/2008 | Dasso | ..................... | A47C 7/546 297/227 |
| 9,756,948 B1 * | 9/2017 | Albite | ..................... | A47C 7/546 |
| 2002/0130538 A1 * | 9/2002 | Artsvelyan | ............ | B60N 2/787 297/227 |
| 2007/0257532 A1 * | 11/2007 | Bukowski | .............. | A47C 31/11 297/219.1 |
| 2009/0295206 A1 * | 12/2009 | Charles | ................... | A47C 31/11 297/227 |
| 2011/0133537 A1 * | 6/2011 | Salee | ..................... | A47C 7/546 297/411.23 |
| 2012/0175926 A1 * | 7/2012 | McKinney | ............. | A47C 31/11 297/220 |

(Continued)

OTHER PUBLICATIONS

HookandLoop.com; https://hookandloop.com/hook-and-loop-brands/velcro/velcro-brand-adhesive-backed-hook-and-loop-fasteners (Year: 2019).*

(Continued)

*Primary Examiner* — Mark R Wendell
(74) *Attorney, Agent, or Firm* — The Law Offices of Eric W. Peterson (57) ABSTRACT

A cushion for releaseably engaging an armrest, said cushion having a top portion, a padded portion, a bottom portion, and an attachment means configured to releaseably engage the cushion to an armrest, where said armrest comprises a top portion, where said attachment means comprises a hook member and a loop member, where the hook member of the attachment means engages the cushion and the loop member of the attachment means engages the armrest.

12 Claims, 6 Drawing Sheets

(56) References Cited

U.S. PATENT DOCUMENTS

| | | | | |
|---|---|---|---|---|
| 2013/0341979 A1* | 12/2013 | Girard | .................... | A47C 7/021 |
| | | | | 297/227 |
| 2015/0071978 A1* | 3/2015 | Chang | ...................... | A61N 2/06 |
| | | | | 424/402 |
| 2015/0115675 A1* | 4/2015 | Winkelman | ............ | B68G 5/02 |
| | | | | 297/228.13 |
| 2016/0113412 A1* | 4/2016 | Clark | .................... | A47C 7/546 |
| | | | | 297/227 |
| 2016/0166066 A1* | 6/2016 | Rigmaiden | ............ | A47C 7/546 |
| | | | | 297/227 |
| 2017/0150825 A1* | 6/2017 | Lindberg | ............... | A47C 1/143 |
| 2018/0027987 A1* | 2/2018 | Calhoun | .................. | A47C 7/62 |

OTHER PUBLICATIONS

Wayback Machine of HookandLoop.com; https://hookandloop.com/hook-and-loop-brands/velcro/velcro-brand-adhesive-backed-hook-and-loop-fasteners (Year: 2013).*

* cited by examiner

RELEASEABLY ENGAGED ARMCHAIR CUSHION

CROSS-REFERENCE TO RELATED APPLICATION

This application claims the benefit of U.S. Design application Ser. No. 29/621,399, filed on Oct. 6, 2017, which is incorporated herein by reference in its entirety.

BACKGROUND

The armrest of chairs including, patio chairs, dining chairs, office chairs, etc. are not always the most comfortable or cleanest. Chair armrests are typically constructed of relatively hard materials, such as metal or plastic, and offer little, if any, padding to soften the effects of long term arm support. Passenger's forearms and elbows may become sore and achy from the lack of support and/or being in contact with such hard surfaces for prolonged period of time. Chair armrests may also be dirty or germ infested from repeated use, thereby discouraging users from contacting or utilizing the armrest and whatever little comfort it may provide.

SUMMARY OF THE INVENTION

The present disclosure pertains to a cushion for releaseably engaging an armrest, said cushion having a top portion having a padded portion, a bottom portion, and an attachment means configured to releaseably engage the cushion to an armrest, where said armrest comprises a top portion, where said attachment means comprises a hook member and a loop member. One aspect of the disclosure is a cushion where the hook member of the attachment means engages the cushion and the loop member of the attachment means engages the armrest. Another aspect of the disclosure is a cushion, where the loop member of the attachment means engages the cushion and the hook member of the attachment means engages the armrest. Another aspect of the disclosure is a cushion where the hook member of the attachment means engages the bottom portion of the cushion and the loop member of the attachment means engages the top portion of the armrest. Another aspect of the disclosure is a cushion where the loop member of the attachment means engages the bottom portion of the cushion and the hook member of the attachment means engages the top portion of the armrest.

Another aspect of the disclosure is a cushion where the padded portion is made of velvet. Another aspect of the disclosure is a cushion where the padded portion is provided in more than one color. Another aspect of the disclosure is a cushion where the length of the attachment means is substantially the same as the length of the cushion. Another aspect of the disclosure is a cushion where the cushion has a hem extending at least a portion of the perimeter edge of the cushion. Another aspect of the disclosure is a cushion of claim 9 where the hem extends the entire perimeter edge of the cushion. Another aspect of the disclosure is a cushion of claim 9 where the hem wraps the perimeter edge of the cushion, where the hem is configured to engage the top portion of the cushion and the bottom portion of the cushion.

With those and other objects, advantages and features on the invention that may become hereinafter apparent, the nature of the invention may be more clearly understood by reference to the following detailed description of the invention, the appended claims, and the drawings attached hereto.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to a cushion 100, as shown in FIGS. 1-4, that can be used with an armrest 200, for example, without limitation, an armrest of a patio seating, dining chairs, office chairs, living room seating, lanai seating, outdoor seating, pool seating, beach seating, recreational seating, hotel seating, or the like, seat armrest, for example, without limitation, an armrest of an automobile, boat seat, trucking console, or the like, center console armrest, and other types of support structure. The armrest cushion 100 can provide a cushioned support to the user of the armrest 200.

Figure 2:
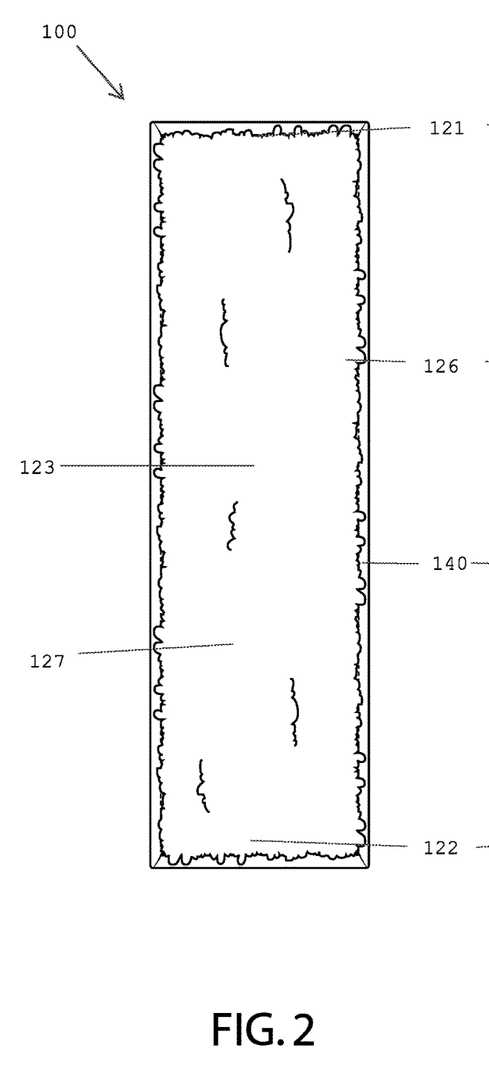
FIG. 2 is a top down view of a cushion according to an exemplary embodiment.
Figure 3:
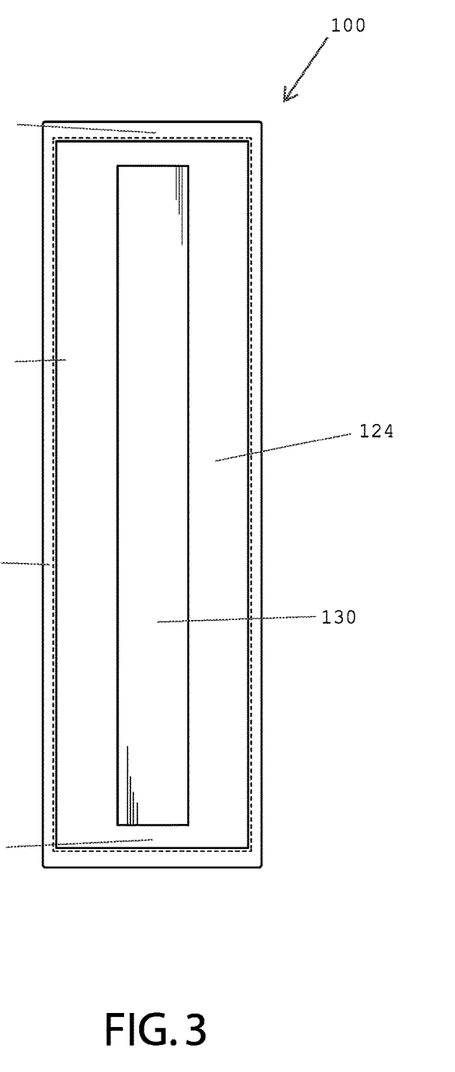
FIG. 3 is a bottom up view of a cushion according to an exemplary embodiment.
Figure 4:
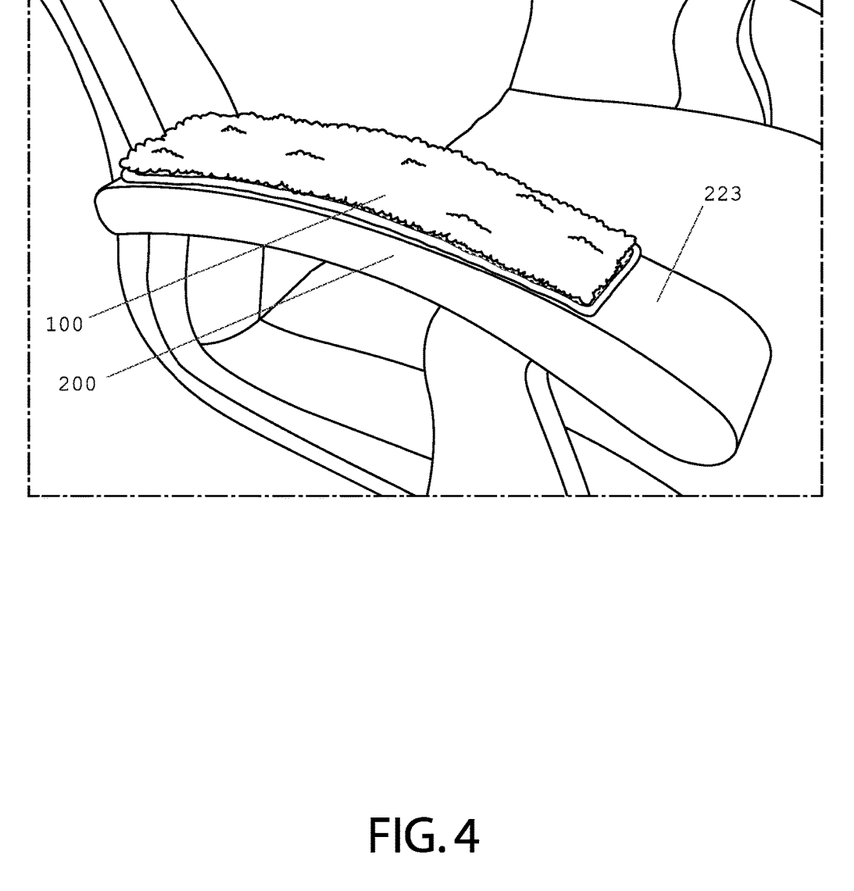
FIG. 4 is a perspective view of a cushion engaged to an armrest according to an exemplary embodiment.
Figure 5:
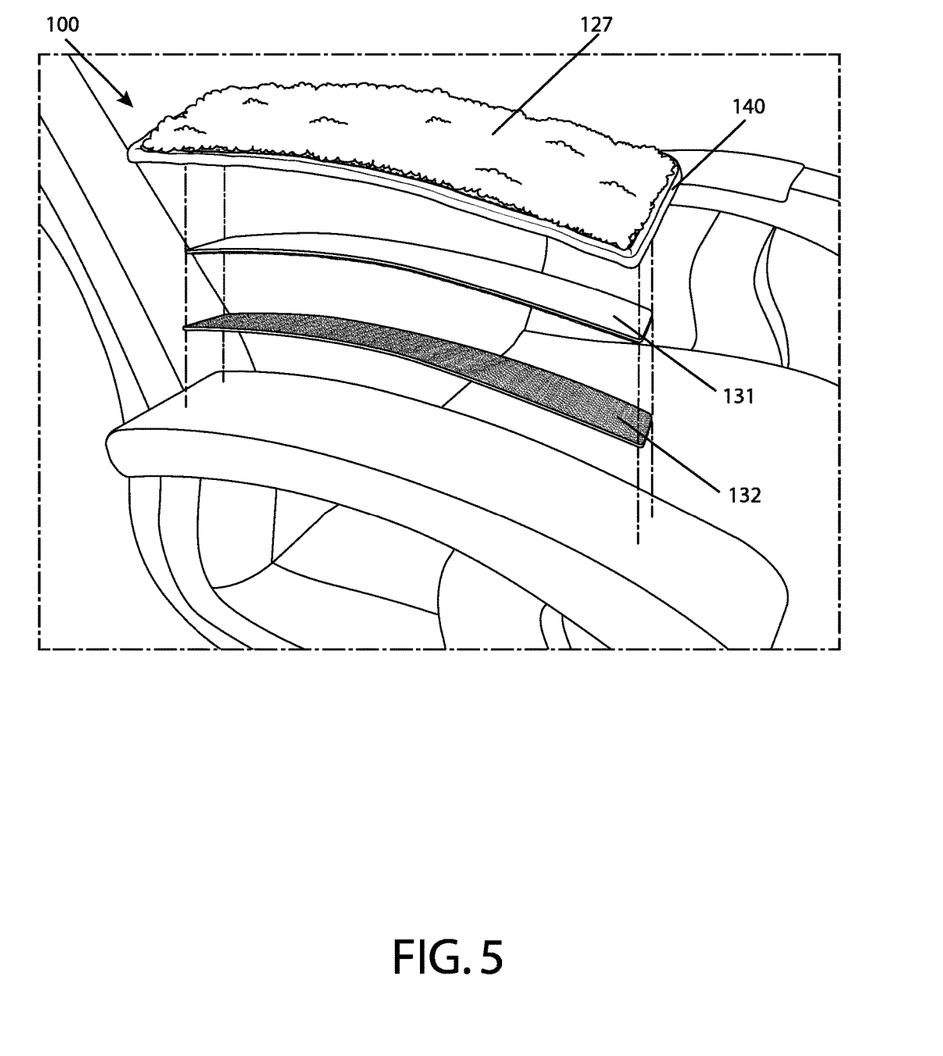
FIG. 5 is an exploded view of a cushion engaged to an armrest according to an exemplary embodiment.
Figure 6:
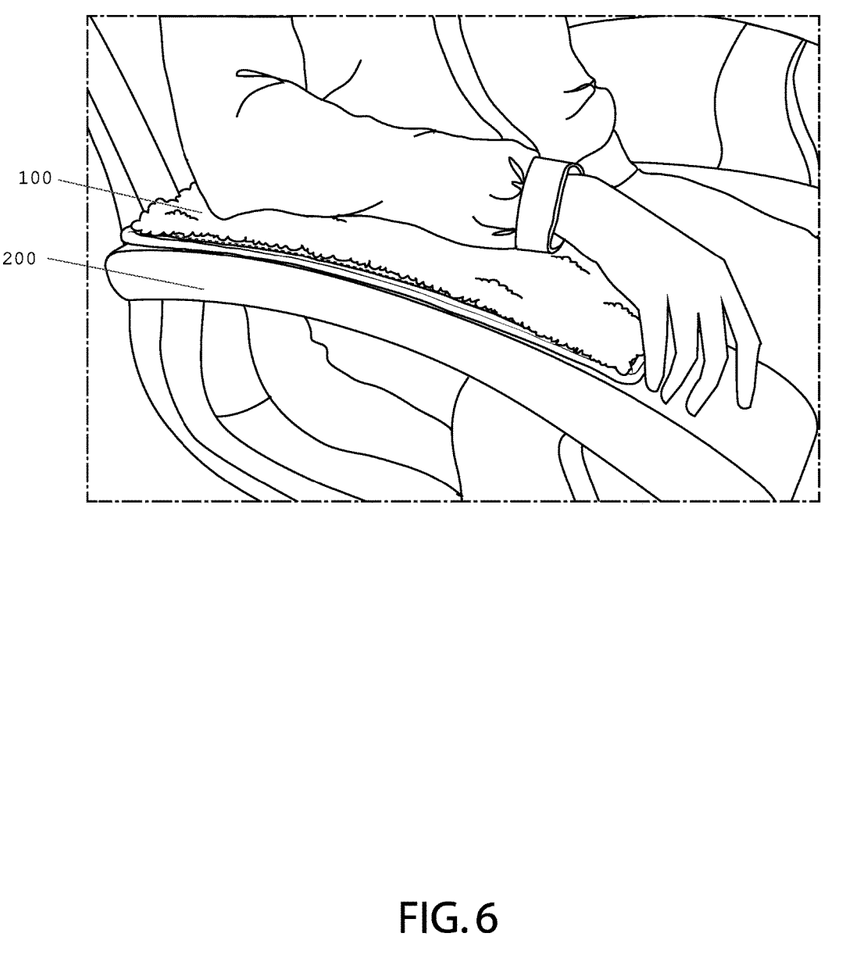
FIG. 6 is a perspective view of a cushion engaged to an armrest wherein the user's arm rests comfortably atop of the cushion according to an exemplary embodiment.
Figure 7:
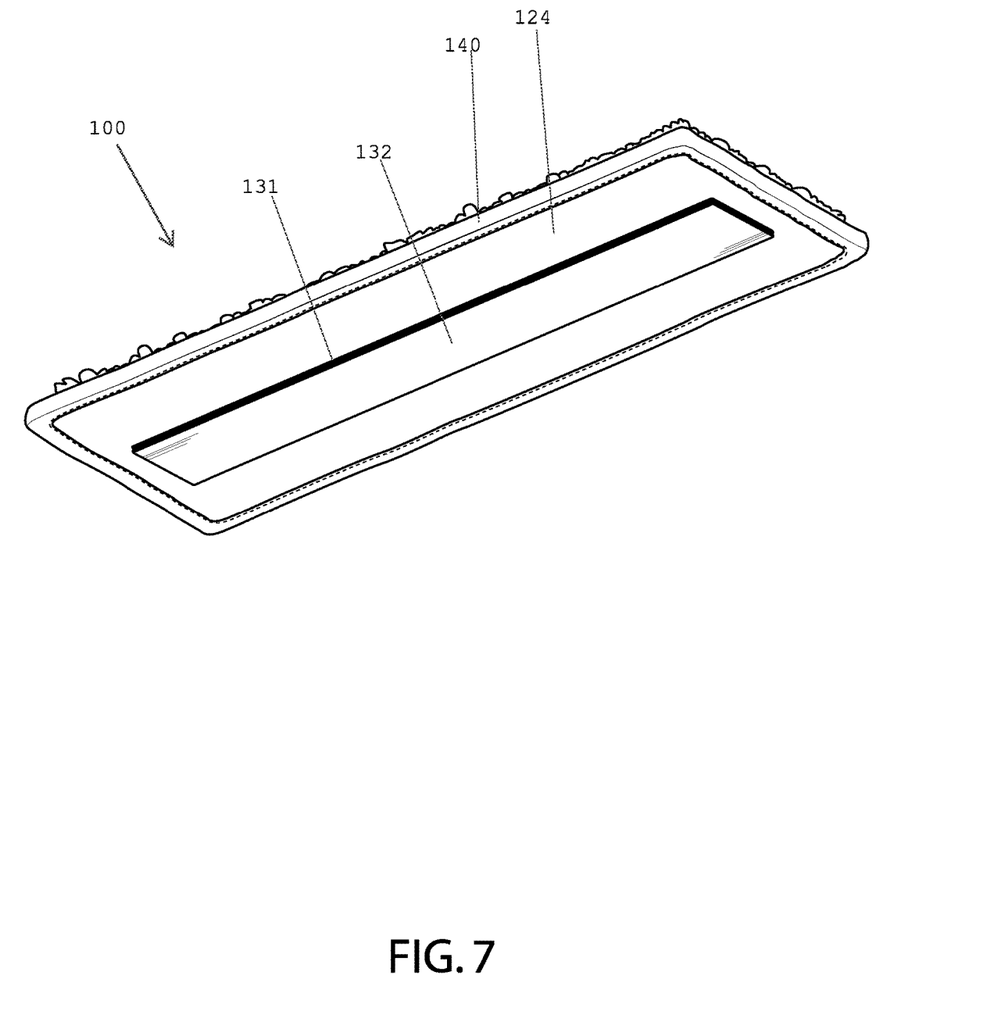
FIG. 7 is a perspective view of a cushion according to an exemplary embodiment.

As shown in FIGS. 2-3, cushion 100 is preferably comprised of a first end portion 121, a second end portion 122, a top portion 123, a bottom portion 124, and side portions 126. The top portion 123 of the cushion 100 can have a padded portion 127. The padded portion 127 can be made of any soft or smooth natural or synthetic material, for example, without limitation velvet, sheepskin, foam, fur, neoprene, EPDM (ethylene propylene diene methylene), polyethylene, ethylene vinyl acetate, nitrile vinyl, silicone sponge, silicone foam or the like could also be used without affecting the overall concept. The overall dimensions of cushion 100 can approximate those of the armrest 200. For example, without limitation, the overall length of cushion 100, as measured between first end portion 121 and second end portion 122, and is preferably between 4 and 16 inches, and the overall width of the cushion 100, as measured between opposing side portions 126, is preferably between 1 and 16 inches. The thickness of cushion 100, as measured between top portion 123 and bottom portion 124, is preferably between 10 and 15 mm, though it is also contemplated that the dimensions may be less than the dimensions of the armrest 200, may suit user preference, or may accommodate a particular application. Cushion 100 may be fabricated with various designs or patterns printed, stitched, or otherwise disposed thereon, and may also be fabricated in various colors to increase the aesthetic appeal, appearance and/or performance thereof.

In one embodiment, as shown in FIGS. 4-7, the armrest cushion 100 can be releaseably engaged to the armrest 200 thereby allowing a user to disengage the armrest cushion 100 from the armrest 200. Releasing the armrest cushion 100 from the armrest 200 allows for the armrest 200 to be removed for various reasons, for example, without limitation, replacing the armrest cushion 100 with another armrest cushion 100 due to user preference of a different armrest cushion 100 with different material, dimensions, color, or the like, and allowing for the armrest cushion 100 to be washed.

The cushion 100 can be attached to the top portion 223 of the armrest 200 with an attachment means 130. The attachment means 130 can be any means for releaseably attaching the cushion 100 to the armrest 200. For example, without limitation, the attachment means 130 can be a hook and loop fastener, though other means of attachment may also be employed. Where the attachment means 130 is a hook and loop fastener, the hook member 131 of the attachment means 130 can engage the bottom portion 124 of the cushion 100 by way of adhesive, or the like, and the loop member 132 of the attachment means 130 can engage the top portion 223 of the armrest 200 by way of adhesive, or the like.

Figure 1:
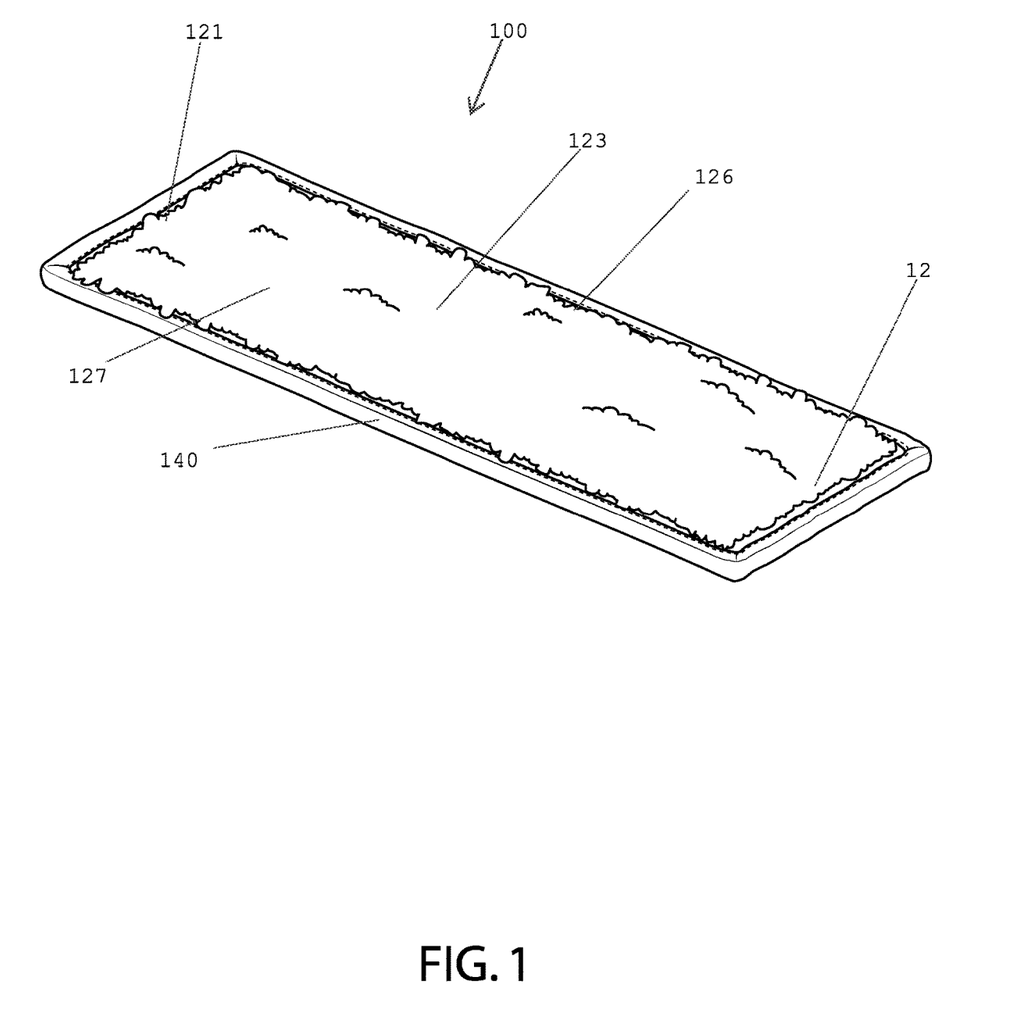
FIG. 1 is a perspective view of a cushion according to an exemplary embodiment.

In one embodiment, as shown in FIGS. 1-3, the cushion 100 can have a hem 140 to prevent fraying of the padded portion 127. The hem 140 can extend a portion of or the entire perimeter of the cushion 100. The hem 140 can wrap about the edge of the cushion 100, for example, without limitation, the hem 140 can engage the top portion 123 and the bottom portion 124 about the edge of the cushion 100. The hem 140 can be created by any normal means of creating a hem, for example, without limitation, a sewn hem, an adhesive hem, or the like. In one embodiment, the hem 140 is an additional piece of fabric that is folded along the edge of the cushion 100 and then secured to the cushion 100.

The following describes a method of using the armchair cushion 100. The armrest 200 can have a first end portion 221, second end portion 222, a top portion 223, a bottom portion 224 and opposing sides 226. The user 200 can temporarily install the armrest cushion 100 by affixing the hook member 131 (or loop member 132) of the attachment means 130 onto the top portion 223 of the armrest 200, the loop member 132 (or hook member 131) of the attachment means 130 onto the bottom portion 124 of the cushion 100, and engaging the hook member 131 to the loop member 132. The user then positions the user's arm on the top portion 123 of the cushion.

When use of the armrest cushion 100 concludes, the user removes the user's arm from the top portion 123 of the cushion. The user can quickly and easily remove the cushion 100 from the armrest 200 by disengaging the loop member 132 from the hook member 131 thereby disengaging the cushion 100 from the armrest 200. The cushion 100 may then be cleaned and/or disinfected by any means known in the art and reused or stored for future use. In this manner, armrest cushion 100 can be releaseable attached to armrest 200 to provide comfort to a user during use of the armrest 200.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A cushion for releaseably engaging an armrest, said cushion comprising:
   a padded portion,
   a base having a bottom side, and
   an attachment means configured to releaseably engage the cushion to an armrest,
   wherein said attachment means comprises a hook member and a loop member, wherein said hook member attaches to the bottom side of the base, and wherein said loop member is configured to attach to an armrest, and wherein a portion of the material comprising the padded portion is interwoven into the base.

2. A cushion of claim 1, wherein the hook member of the attachment means engages the cushion and the loop member of the attachment means engages the armrest.

3. A cushion of claim 1, wherein the loop member of the attachment means engages the cushion and the hook member of the attachment means engages the armrest.

4. A cushion of claim 1 wherein the hook member of the attachment means engages the bottom portion of the cushion and the loop member of the attachment means engages a top portion of the armrest.

5. A cushion of claim 1 wherein the loop member of the attachment means engages the bottom portion of the cushion and the hook member of the attachment means engages a top portion of the armrest.

6. A cushion of claim 1 wherein the padded portion is made of velvet.

7. A cushion of claim 1 wherein the length of the attachment means is substantially the same as the length of the cushion.

8. A cushion of claim 1 wherein the cushion has a hem extending at least a portion of the perimeter edge of the cushion.

9. A cushion of claim 8 wherein the hem extends the entire perimeter edge of the cushion.

10. A cushion of claim 8 wherein the hem wraps the perimeter edge of the cushion, wherein the hem is configured to engage the top portion of the cushion and the bottom portion of the cushion.

11. A cushion of claim 1 wherein the hook member of the attachment means engages the bottom portion of the cushion by way of adhesive.

12. A cushion of claim 1 wherein the loop member of the attachment means is configured to engage a top portion of the armrest by way of adhesive.

* * * * *